Patented Nov. 6, 1945

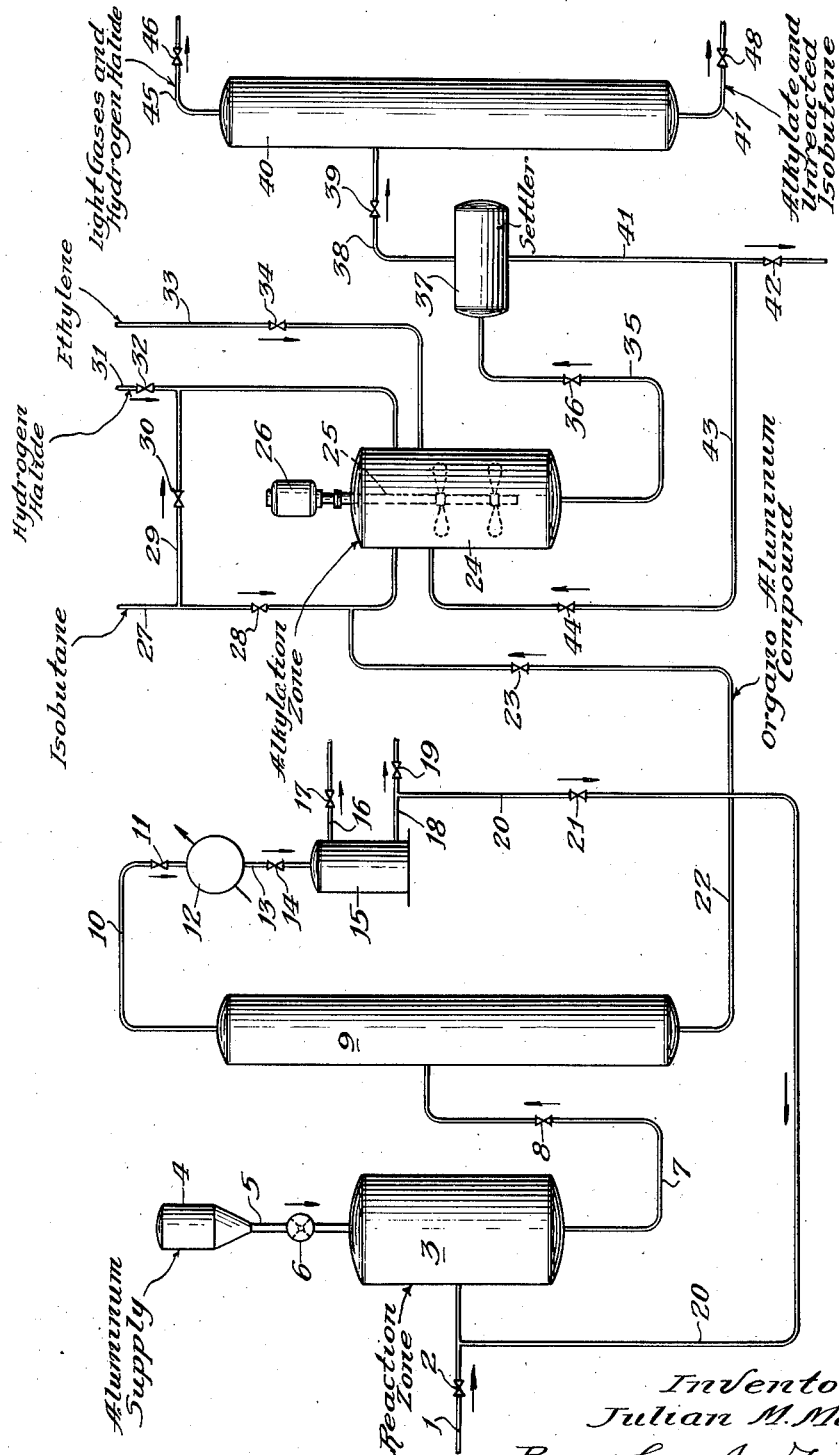

2,388,428

UNITED STATES PATENT OFFICE 2,388,428

CATALYSIS OF ORGANIC REACTIONS

Julian M. Mavity, Riverside, Ill., assignor to Universal Oil Products Company, Chicago, Ill., a corporation of Delaware Application March 31, 1943, Serial No. 481,275

22 Claims. (Cl. 260—671)

This invention relates to an improved method for effecting organic chemical reactions of the type ordinarily catalyzed by a Friedel-Crafts metal halide catalyst.

It is particularly directed to an improved method for conducting hydrocarbon conversion reactions such as the isomerization of saturated hydrocarbons including paraffins and naphthenes, the alkylation of cyclic and aliphatic hydrocarbons with olefins, and the polymerization of unsaturated hydrocarbons.

Friedel-Crafts type metal halide catalysts, particularly aluminum chloride, are extremely effective in the catalysis of various organic reactions and are especially useful in the alkylation and isomerization of hydrocarbons. Aluminum halide catalysts, however, are usually overactive and present difficult handling problems since they are highly hygroscopic. Moreover, when aluminum halide catalysts such as $AlCl_3$ or $AlBr_3$ are employed, the formation of aluminum halide—hydrocarbon complexes or "sludges" is an unavoidable although undesirable side reaction resulting in many cases in high catalyst consumption and low efficiencies. Because of the relatively high activity of Friedel-Crafts catalysts such as aluminum chloride, it is extremely desirable to use only the minimum amount of catalyst which is necessary to effect the desired reaction.

It is one object of the present invention to provide a new and improved method for effecting organic chemical reactions in the presence of Friedel-Crafts metal halide catalysts. Another object of the invention is to provide a novel and advantageous method for conducting hydrocarbon conversion reactions in the presence of an aluminum halide catalyst. In one broad aspect the invention comprises a method of generating a metal halide catalyst in situ in a reaction zone whereby to effect an organic chemical reaction of the type ordinarily catalyzed by a Friedel-Crafts metal halide catalyst.

In one specific embodiment the invention comprises a method of effecting hydrocarbon conversion reactions which comprises dissolving an organoaluminum compound in a hydrocarbon reactant being charged to the process and contacting said solution with an excess of hydrogen halide in a reaction zone under hydrocarbon conversion conditions whereby an aluminum halide catalyst is generated in situ and the desired hydrocarbon conversion reaction is thereby effected.

The organoaluminum compounds employed in my invention comprise the compounds having the formula $R_nAlX_{3-n}$ wherein R represents a hydrocarbon radical selected from the group consisting of alkyl and aryl radicals, X represents a halogen selected from the group consisting of chlorine, bromine, and iodine, and $n$ represents an integer not greater than 3. Thus the invention contemplates the use of organoaluminum halides of the type $RAlX_2$ and $R_2AlX$ both of which are readily prepared by several methods. In compounds of the $R_2AlX$ type, the R groups may be the same or different, e. g.

$(CH_3)(C_2H_5)AlX.$

The preferred method of preparation involves the reaction of an alkyl or aryl halide with metallic aluminum according to the following equation:

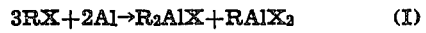

$$3RX + 2Al \rightarrow R_2AlX + RAlX_2 \qquad (I)$$

The equimolecular mixture of organoaluminum compounds formed in this reaction is ordinarily referred to as an alkyl or aryl aluminum sesquihalide.

Although the above reaction is the most desirable method of preparing the organoaluminum compounds, which are the source of aluminum halide catalysts according to the present invention, nevertheless, any other method of preparation of these compounds may be employed, e. g., the dihalide type organoaluminum compound is readily prepared by reacting a monohalide or sequihalide compound with pure aluminum halide according to the following equation:

$$R_2AlX + AlX_3 \rightarrow 2RAlX_2 \qquad (II)$$

It is also possible to employ an aluminum-magnesium alloy for reaction with alkyl halides and obtain only the monohalide type organoaluminum compound instead of the mixture or sequihalide shown in Equation I. The use of the alloy is illustrated by the following equation:

$$(2Al + Mg) + 4RX \rightarrow 2R_2AlX + MgX_2 \qquad (III)$$

The invention also includes the use of compounds of the type $R_3Al$ where $n=3$ in the formula $R_nAlX_{3-n}$. These aluminum trialkyls and triaryls are somewhat more difficult to prepare and for this reason the organoaluminum halides hereinbefore described are preferred. The R groups in the $R_3Al$ compounds may be the same or different, e. g., $RR'R''Al$ where R, R', and R'' are different alkyl or aryl groups. The $R_3Al$ compounds may be prepared by reacting organoaluminum halides with sodium according to the following equations:

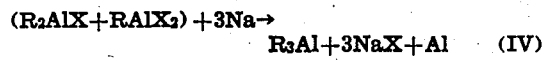
$$R_3Al + 3NaX + Al \quad (IV)$$
$$3R_2AlX + 3Na \rightarrow 2AlR_3 + 3NaX + Al \quad (V)$$

The various procedures for obtaining the organoaluminum compounds employed in the present invention are not necessarily equivalent and it is not intended to limit the invention to any particular method. Details of the methods hereinbefore described may be found in an article entiled "Organoaluminum compounds, I. Methods of preparation" by A. V. Grosse and J. M. Mavity, Journal of Organic Chemistry, volume 5, No. 2, pages 106–121 (March 1940) and also in U. S. Patent 2,270,292 issued Jan. 20, 1942, to A. V. Grosse.

The proportion of organoaluminum compound required in the method of this invention is usually small. As will be described hereinafter in greater detail, the organoaluminum compound is introduced into the reaction zone by any convenient means, e. g., by direct introduction or by first forming a solution of the organoaluminum compound in one or more of the hydrocarbon reactants. In the case where the organoaluminum compound is introduced directly into the reaction zone, it may be desirable to add free aluminum halide to the organoaluminum compound in which case the latter also serves as a carrying medium. Hydrogen halide is also introduced into the reaction zone, and the organoaluminum compound is converted to the aluminum halide as illustrated by the following equation wherein the organoaluminum compound comprises the sesquihalide:

By generating at least a portion of the aluminum halide catalyst in situ it is possible to control very accurately the amount of aluminum halide catalyst which is present in the reaction zone at any given time. Since aluminum halide catalysts are usually employed in conjunction with a hydrogen halide promoter or activator it is desirable to introduce an excess of hydrogen halide into the reaction zone, i. e., an excess over the amount required to completely convert the organoaluminum compound to the aluminum halide. The excess hydrogen halide serves as an activator for the aluminum halide catalyst generated in situ and may be recovered from the reaction products and recirculated in the conventional manner.

Although many organoaluminum compounds may be employed in the process of the present invention, it is not intended that these compounds be considered as equivalents. In general, the choice of organoaluminum compound will depend upon many factors including the nature of the hydrocarbon conversion reaction which it is desired to catalyze, operating conditions, the availability or ease of preparation of the organoaluminum compound, etc. These compounds are generally liquids or low melting solids and in the pure state must be handled with care since they are extremely reactive, particularly with water, and in many cases are also spontaneously inflammable in the presence of air. However, when an organoaluminum compound is dissolved in relatively small concentrations in a hydrocarbon charging stock as contemplated in one embodiment of the present invention, the high reactivity of the organoaluminum compound is readily controlled.

In general, I prefer to employ methyl or ethyl aluminum sesquihalides, particularly the sesquichlorides, since clean-cut reactions are obtained in their presence. Moreover, when the methyl or ethyl organoaluminum compounds are reacted with hydrogen halide in the reaction zone, the RH which is generated according to Equation VI comprises either methane or ethane which are easily separated from the hydrocarbon reaction products.

The method of my invention finds particular application in reactions involving the alkylation, isomerization, polymerization, cracking or condensation of organic compounds and particularly of hydrocarbons.

The alkylation of paraffinic hydrocarbons, particularly isoparaffins, such as isobutane, isopentane, isohexane, etc. is included within the scope of the present invention. The higher molecular weight homologues of isobutane or other branched chain paraffinic hydrocarbons containing at least one tertiary carbon atom may also be employed. In general, other saturated hydrocarbons such as naphthenes including cycloparaffins and alkylcycloparaffins may also be alkylated under conditions generally applicable to the alkylation of paraffins. The invention is also applicable to the alkylation of unsaturated cyclic compounds such as aromatics and particularly aromatic hydrocarbons. The aromatic hydrocarbons which may be employed include both the mononuclear aromatics such as benzene, toluene, and other alkyl benzenes and also the polynuclear aromatics such as naphthalene, anthracene, etc.

Generally, olefinic hydrocarbons are the preferred alkylating agents for the alkylation of the aliphatic or cyclic hydrocarbons. These olefins may include the aliphatic normally gaseous olefins such as ethylene, propylene, and butylene and also the normally liquid olefins such as hexylene, etc. including polymers of the lower boiling olefins. Cyclic olefins such as cyclohexene, diolefins such as butadiene and isoprene, and also the non-conjugated diolefins and other poly olefins may also be employed as alkylating agents particularly for the aromatic hydrocarbons. It is to be understood, however, that the various classes of olefins are not necessarily equivalent in their action as alkylating agents. Moreover, within any given class of olefinic alkylating agents the separate members of the class are also not necessarily equivalent, e. g. in the class of monoolefinic hydrocarbons, ethylene or propylene being the lowest members of the series may require different operating conditions than are required in the case of butylene or other more reactive higher molecular weight members of the series.

In the case of aromatics, other alkylating agents such as alcohols, ethers, esters, alkyl halides, etc. may be employed instead of the olefinic hydrocarbons. Again it should be noted that the use of these compounds as alkylating agents is not to be construed as being on an equivalent basis with the use of olefinic alkylating agents since somewhat different operating conditions may be necessary depending upon the particular reactants, the nature of the catalyst, and upon other factors.

In general, the alkylation reactions may be carried out in the presence of aluminum halide catalysts at a temperature within the range of from about 50° F. to about 250° F. and under a pressure of from substantially atmospheric to approximately 50 atmospheres or more. The pressure should be sufficiently high to maintain a substantial proportion of the hydrocarbons in the liquid phase. It is also desirable to have an excess of the isoparaffinic, naphthenic, or aromatic compound over the alkylating agent in order to insure that the alkylation reaction will predominate over other side reactions such as polymerization, etc.

Another important hydrocarbon conversion reaction to which the present invention is readily applied, is the isomerization of saturated hydrocarbons including normally gaseous and normally liquid paraffins and the naphthenic or cycloparaffinic hydrocarbons. The conversion of paraffin hydrocarbons of straight chain or mildly branched structure into compounds of a more highly branched character is of great importance in the petroleum industry. Normal butane is readily converted to the more reactive isobutane useful in alkylation reactions, and the normally liquid paraffins such as those found in straight run fractions may be converted to branched chain isomers thereof which possess considerably higher antiknock values. These isomerization reactions are generally conducted at a temperature within the range of from about 50° F. to about 350° F. and at a pressure of from about atmospheric to 50 atmospheres or more. The particular temperature to be employed in a given case will, of course, depend upon the charging stock and upon other factors. A hydrogen halide activator is employed and in some cases hydrogen may also have a beneficial effect.

In order to illustrate the invention more fully, reference is now made to the drawing which illustrates the alkylation of isobutane with ethylene as effected according to the method of the present invention.

Reaction zone 3 represents a conversion zone wherein an alkyl halide such as methyl or ethyl chloride is introduced through line 1 and valve 2 and is reacted therein with aluminum metal to produce methyl or ethyl aluminum sesquihalide. The aluminum metal is introduced in finely divided or granular form from vessel 4 through line 5 and a flow control means such as star feeder 6. Reaction zone 3 may comprise a mechanically agitated zone or any other convenient type of reaction zone well-known to those skilled in the art.

The reaction mixture passes through line 7 and valve 8 to fractionator 9. Unconverted alkyl halide is removed overhead through line 10 and valve 11 to condenser 12. The condensate and any noncondensable gases which may be present pass through line 13 and valve 14 to receiver 15. Noncondensable gases are vented through line 16 and valve 17. The unconverted alkyl halide may be withdrawn through line 18 and valve 19, but is preferably recycled through line 20 containing valve 21 to line 1 and thence to reaction zone 3. Although not shown on the drawing a portion of the material from line 20 is preferably returned to the fractionator 9 as reflux according to well-known methods of operation.

The higher boiling methyl or ethyl aluminum sesquihalide is withdrawn through line 22, and all or any desired portion thereof passes through valve 23 to line 27 wherein it is commingled with fresh isobutane charging stock introduced through valve 28. Although not indicated in the drawing it may be desirable to provide a storage zone wherein the organoaluminum compound is stored and supplied in regulated quantities to line 27. A mixing zone may also be provided wherein the organoaluminum compound is contacted with and dissolved in the isobutane stream. The isobutane containing dissolved organoaluminum compound passes through line 27 to alkylation zone 24. Hydrogen halide is also introduced to the alkylation zone through line 31 and valve 32. If desired, only a portion of the isobutane may be employed as a carrying medium to introduce the organoaluminum compound to the reaction zone through line 27. The remainder of the isobutane stream may be passed through line 29 and valve 30 to line 31 wherein it is commingled with hydrogen halide and then passed to the alkylation zone 24. The ethylene reactant is introduced through line 33 containing valve 34. In most cases both the isobutane and ethylene streams may be of any desired degree of purity, e. g. the isobutane reactant may comprise a fraction also containing normal butane along with minor amounts of propane and pentane. The ethylene fraction may contain substantial amounts of ethane.

The alkylation zone 24 may comprise any conventional type of alkylating equipment. For the sake of illustration the drawing depicts a mechanically agitated zone containing a stirring mechanism 25 operated by a motor 26. However, a packed reaction zone containing a granular packing material of any well-known type may be employed with good results. Other types of contactors containing sprays, jets, orifice plates, etc. may be employed.

Dependent upon the particular hydrocarbon conversion reaction, the aluminum halide which is generated in situ may be in any of several physical forms. In the isobutane-ethylene alkylation process shown in the drawing the amount of aluminum halide generated may be of such small proportions that it is readily soluble in the hydrocarbon reactants. In other cases it is possible that there may be an actual precipitation of the solid aluminum halide. In either event, however, the aluminum halide is gradually converted into a fluid aluminum halide-hydrocarbon complex which possesses catalytic activity. The reaction mixture passes from line 35 through valve 36 to a settling zone 37. The lower layer comprising the aluminum halide-hydrocarbon complex may be withdrawn through line 41 and valve 42 or if desired it may be recycled through line 43 and valve 44 to the alkylation zone 24. The upper hydrocarbon layer is withdrawn from settler 37 through line 38 and valve 39 and is introduced into fractionator 40. Light gases and excess hydrogen halide are removed through line 45 containing valve 46 to further separation steps not shown. The hydrogen halide is preferably recycled to the alkylation zone. The light gases including ethane or methane may be converted to alkyl halides for reuse in the first step of the process. The alkylation reaction products and other unconverted reactants are withdrawn through line 47 and valve 48 to be subjected to further separation steps not shown. The unreacted isobutane is preferably recycled to the alkylation step.

For the sake of simplicity the well known details of the fractionating steps, the use of pumps, etc. have been omitted from the drawing.

As an alternative method of operation, hereinbefore described but not shown in the drawing, the organoaluminum compound may be employed as a liquid carrying medium for the introduction of free aluminum halide catalyst into the reaction zone in the form of a solution of aluminum halide in organoaluminum compound. In such a method of operation the isobutane or other hydrocarbon reactants are usually not commingled with the organoaluminum compound-aluminum halide solution prior to their introduction into the reaction zone. The quantity of organoaluminum compound employed in the reaction is regulated so that the total aluminum halide including that introduced in solution and that formed by interaction of hydrogen halide with organoaluminum compound is the amount desired to catalyze the reaction.

The advantages of the present method of employing aluminum halide catalysts for organic reactions of the type ordinarily catalyzed by a Friedel-Crafts metal halide catalyst may be summarized briefly as follows.

(1) The present invention provides a convenient means of continuously introducing a controlled amount of aluminum halide catalyst into the reaction zone.

(2) The difficulties attendant on the handling of anhydrous aluminum halide catalysts are eliminated since a portion of the active catalyst may be generated in situ.

(3) The organoaluminum compounds which are employed as the source of aluminum halide are non-corrosive which is in contrast to many aluminum halide-hydrocarbon complexes or "sludges."

(4) The present method is particularly effective in alkylation reactions wherein the temperatures employed are too low to employ other methods of introducing controlled amounts of aluminum halide into a catalytic alkylation zone, e. g. by volatilizing aluminum chloride and injecting the vapors into the alkylation zone, or by dissolving aluminum chloride in a reactant and charging the solution to the alkylation zone.

The following examples are given to illustrate the nature of the results which may be obtained by the process of my invention but it is not intended to limit the generally broad scope of the invention by the details of these examples.

Example I

Methyl chloride and finely divided aluminum metal are reacted to produce methyl aluminum sesquichloride which for convenience may be represented by the formula $(CH_3)_3Al_2Cl_3$. The hydrocarbon charging stock to the process consists of a straight run hexane fraction comprising about 85% paraffins and 15% naphthenes which has a specific gravity of 0.68 at 60° F. and an ASTM octane number of 59.

About 17.1 g. of the methyl aluminum sesquichloride is dissolved in 8 liters of the hydrocarbon charging stock. This solution is then passed through a 500 cc. packed reaction zone containing ¼ inch semi-porcelain berl saddles at a liquid hourly space velocity of 0.1, a pressure of 400 pounds per square inch gage, and a temperature of 170° F. Hydrogen chloride is introduced continuously into the reaction along with the hydrocarbon charge containing the dissolved organoaluminum compound. The hydrogen chloride rate of introduction is about 1.5 grams per hour which corresponds to approximately 10.4 mol per cent hydrogen chloride based on the hydrocarbons charged.

The hydrocarbon product is recovered in almost quantitative yields, and as a result of isomerization reactions the ASTM octane number of the product is increased to 72. If desired, this product can be fractionated into a higher octane number portion having an ASTM octane number of from about 85 to about 92 and a lower octane number fraction which may be recycled to the isomerization zone.

Example II

In this example isobutane is alkylated with ethylene in the presence of aluminum chloride and hydrogen chloride.

Methyl aluminum sesquichloride prepared as in Example I is dissolved in isobutane to the extent of about 0.13 gram per 100 cc. of liquid isobutane. The reaction zone comprises a 362 cc. packed zone containing ¼ inch semiporcelain berl saddles. The solution of organoaluminum compound in isobutane is charged to the reaction zone at a rate of about 112 grams per hour. Ethylene is charged to the reaction zone at a rate of about 10.8 grams per hour thereby maintaining a molal ratio of isobutane to ethylene of approximately 5.0. Approximately 2.0 grams per hour of hydrogen chloride is introduced which corresponds to about 2.3 mol per cent hydrogen chloride based on the total hydrocarbons charged. The alkylation reaction is carried out at a temperature of about 130° F. and at about 250 pounds per square inch gage. A yield of about 240 weight per cent total alkylate is obtained based on the ethylene charged of which the major portion comprises hexanes. The alkylate has an ASTM octane number of over 90. Over a substantial period of time the yield of alkylate per unit of organoaluminum compound consumed is approximately 18.5 gallons per pound of methyl aluminum sesquichloride.

Even better results can be obtained in certain cases by employing a mechanically agitated reaction zone whereby the fluid aluminum chloride-hydrocarbon complexes may be subjected to intimate contact with the hydrocarbon reactants.

I claim as my invention:

1. A method for effecting organic chemical reactions of the type ordinarily catalyzed by a Friedel-Crafts metal halide catalyst which comprises forming a solution of an organoaluminum halide in at least one of the reactants, the halogen of said halide being selected from the group consisting of chlorine, bromine, and iodine, and introducing a hydrogen halide into the reaction zone in an amount in excess of that required to liberate the aluminum halide from said organoaluminum halide within the reaction zone.

2. A process for effecting hydrocarbon conversion reactions which comprises forming a solution of an organoaluminum compound in at least one of the hydrocarbon reactants, said organoaluminum compound having the formula $$R_nAlX_{3-n}$$

wherein R represents a hydrocarbon radical selected from the group consisting of alkyl and aryl radicals, X represents a halogen selected from the group consisting of chlorine, bromine, and iodine, and $n$ is an integer not greater than 3, introducing said solution into the reaction zone maintained under conversion conditions, and introducing a hydrogen halide into said reaction zone in an amount in excess of that required to liberate the aluminum halide from said organoaluminum halide within the reaction zone.

3. A process for effecting hydrocarbon conversion reactions which comprises introducing the hydrocarbon reactants into a reaction zone maintained under conversion conditions, introducing into said reaction zone an organoaluminum compound having the formula $R_nAlX_{3-n}$ wherein R represents a hydrocarbon radical selected from the group consisting of alkyl and aryl radicals, X represents a halogen selected from the group consisting of chlorine, bromine, and iodine, and $n$ is an integer not greater than 3, and introducing a hydrogen halide into said reaction zone in an amount in excess of that required to react with said organoaluminum compound and generate an aluminum halide catalyst in situ.

4. A process for the alkylation of hydrocarbons which comprises forming a solution of an organoaluminum compound in an alkylatable hydrocarbon, said organoaluminum compound having the formula $R_nAlX_{3-n}$ wherein R represents a hydrocarbon radical selected from the group consisting of alkyl and aryl radicals, X represents a halogen selected from the group consisting of chlorine, bromine, and iodine, and $n$ is an integer not greater than 3, and contacting said solution with an alkylating agent and a hydrogen halide under alkylating conditions whereby said hydrogen halide and said organoaluminum compound react to generate an aluminum halide catalyst in situ.

5. A process for the isomerization of saturated hydrocarbons which comprises forming a solution of an organoaluminum compound in an isomerizable saturated hydrocarbon, said organoaluminum compound having the formula

wherein R represents a hydrocarbon radical selected from the group consisting of alkyl and aryl radicals, X represents a halogen selected from the group consisting of chlorine, bromine, and iodine, and $n$ is an integer not greater than 3, and contacting said solution with a hydrogen halide under isomerizing conditions whereby said hydrogen halide and said organoaluminum compound are reacted to generate an aluminum halide isomerizing catalyst in situ.

6. A process for the alkylation of isoparaffins with olefins which comprises forming a solution of an alkyl aluminum sesquichloride in the isoparaffinic reactant and contacting said solution with the olefinic reactant and hydrogen chloride under alkylating conditions whereby aluminum chloride is generated in situ and catalyzes said alkylation reaction.

7. The process of claim 4 wherein hydrogen chloride is introduced in substantial excess over the amount required to react with said organoaluminum compound.

8. A process for the isomerization of paraffinic hydrocarbons which comprises forming a solution of an alkyl aluminum sesquihalide in said paraffinic hydrocarbon and contacting said solution with hydrogen chloride under isomerizing conditions whereby aluminum chloride is generated in situ and catalyzes the desired isomerization reaction.

9. The process of claim 5 wherein hydrogen chloride is introduced into the reaction zone in substantial excess over the amount required to react with said organoaluminum compound.

10. The process of claim 6 wherein said alkyl aluminum sesquichloride comprises methyl aluminum sesquichloride.

11. The process of claim 6 wherein said alkyl aluminum sesquichloride comprises ethyl aluminum sesquichloride.

12. The process of claim 8 wherein said alkyl aluminum sesquichloride comprises methyl aluminum sesquichloride.

13. The process of claim 8 wherein said alkyl aluminum sesquichloride comprises ethyl aluminum sesquichloride.

14. The process of claim 3 wherein said organoaluminum compound has the formula $RAlX_2$.

15. The process of claim 3 wherein said organoaluminum compound has the formula $R_2AlX$.

16. The process of claim 3 wherein said organoaluminum compound has the formula $R_3Al$.

17. The process of claim 3 wherein free aluminum halide is added to said organoaluminum compound and the resultant mixture is introduced into said reaction zone in substantially the liquid phase.

18. In the art of reacting hydrocarbons in the presence of aluminum halide catalyst in a reaction zone, the method which comprises dissolving in at least a portion of the hydrocarbon reactants being supplied to said zone an organoaluminum halide whose halogen is selected from the group consisting of chlorine, bromine and iodine, and introducing to the reaction zone a hydrogen halide in sufficient amount to liberate the aluminum halide from the organoaluminum halide within said zone and to promote the hydrocarbon reaction in the reaction zone.

19. A hydrocarbon conversion process which comprises introducing to a reaction zone the hydrocarbons to be converted and an organoaluminum halide whose halogen is selected from the group consisting of chlorine, bromine and iodine, reacting said halide in said zone with a sufficient quantity of a hydrogen halide to liberate aluminum halide from the organoaluminum halide, and subjecting the hydrocarbons to conversion conditions in the presence of the aluminum halide thus formed within the reaction zone.

20. A hydrocarbon conversion process which comprises introducing the hydrocarbons to be converted and an organoaluminum chloride to a reaction zone, reacting said chloride in said zone with a sufficient amount of hydrogen chloride to liberate aluminum chloride from the organoaluminum chloride, and subjecting the hydrocarbons to conversion conditions in the presence of the aluminum chloride thus formed within the reaction zone.

21. The process as defined in claim 20 further characterized in that the hydrocarbon conversion in said zone includes the alkylation of an isoparaffin with an olefin.

22. The process as defined in claim 20 further characterized in that the hydrocarbon conversion in said zone includes the isomerization of a normal paraffin.

JULIAN M. MAVITY.